US012654119B2

(12) United States Patent
Army et al.

(10) Patent No.: US 12,654,119 B2
(45) Date of Patent: Jun. 16, 2026

(54) MID-PRESSURE WATER SEPARATION FOR ENVIRONMENTAL CONTROL SYSTEM

(71) Applicant: Hamilton Sundstrand Corporation, Charlotte, NC (US)

(72) Inventors: Donald E. Army, Enfield, CT (US); Patrick McCord, Norwich, CT (US); Thomas E. Vatter, Holyoke, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 322 days.

(21) Appl. No.: 18/480,176

(22) Filed: Oct. 3, 2023

(65) Prior Publication Data

US 2025/0108322 A1     Apr. 3, 2025

(51) Int. Cl.
| | |
|---|---|
| *B01D 45/08* | (2006.01) |
| *F25B 9/00* | (2006.01) |
| *F25B 9/06* | (2006.01) |
| *F25B 43/00* | (2006.01) |

(52) U.S. Cl.
CPC .............. *B01D 45/08* (2013.01); *F25B 9/004* (2013.01); *F25B 9/06* (2013.01); *F25B 43/00* (2013.01)

(58) Field of Classification Search
CPC ........ B01D 45/08; B01D 45/12; B01D 45/16; F25B 9/004; F25B 9/06; F25B 43/00; B64D 13/06; B64D 2013/0662
See application file for complete search history.

(56) References Cited

U.S. PATENT DOCUMENTS 11,154,804 B2     10/2021     Palmer

FOREIGN PATENT DOCUMENTS

| | | |
|---|---|---|
| CN | 106287087 A | 1/2017 |
| CN | 211913188 U | 11/2020 |
| EP | 3467392 A1 | 4/2019 |
| EP | 4427831 A1 | 9/2024 |
| JP | 2007229583 A | 9/2007 |

OTHER PUBLICATIONS

Search Report issued in European Patent Application No. 24204248. 9; Date of Mailing Jan. 31, 2025 (8 pages).

*Primary Examiner* — Robert Clemente

(74) *Attorney, Agent, or Firm* — CANTOR COLBURN LLP

(57) ABSTRACT

A water separator for use in an environmental control system of an aircraft includes a coalescing channel having a curved housing. The coalescing channel has a hollow interior. A coalescing insert is arranged within the hollow interior of the coalescing channel. The coalescing insert has an upstream end, a downstream end, and plurality of fluidly distinct flow channels extending between the upstream end and the down-stream end such that the plurality of fluidly distinct flow channels receive a flow of medium in parallel.

21 Claims, 6 Drawing Sheets

MID-PRESSURE WATER SEPARATION FOR ENVIRONMENTAL CONTROL SYSTEM

BACKGROUND

Embodiments of the present disclosure relate to environmental control systems for a vehicle, and more particularly, to a water separator suitable for use in an environmental control system of an aircraft.

In existing environmental control systems, an air flow is typically cooled within a heat exchanger then provided to a water collector located downstream from the heat exchanger to capture or remove any free moisture from the airflow. The water collector typically includes a separation device that directs the moisture present within the airflow to outer walls of the separation device and directs the free moisture towards a drain port. Often times the heat exchanger and the water collector is substantially bulky and consume large amounts of space.

BRIEF DESCRIPTION

According to an embodiment, a water separator for use in an environmental control system of an aircraft includes a coalescing channel having a curved housing. The coalescing channel has a hollow interior. A coalescing insert is arranged within the hollow interior of the coalescing channel. The coalescing insert has an upstream end, a downstream end, and plurality of fluidly distinct flow channels extending between the upstream end and the downstream end such that the plurality of fluidly distinct flow channels receive a flow of medium in parallel.

In addition to one or more of the features described above, or as an alternative to any of the foregoing embodiments the coalescing channel has an upstream end and a downstream end and the upstream end is oriented perpendicularly to the downstream end.

In addition to one or more of the features described above, or as an alternative to any of the foregoing embodiments the coalescing insert has a centerline and at least one of the plurality of fluidly distinct flow channels has a spiral-like configuration about the centerline.

In addition to one or more of the features described above, or as an alternative to any of the foregoing embodiments the at least one of the plurality of fluidly distinct flow channels having the spiral-like configuration has an inlet end arranged at the upstream end of the coalescing insert and an outlet end arranged at the downstream end of the coalescing insert. A twist angle formed between the inlet end and the outlet end is 90 degrees.

In addition to one or more of the features described above, or as an alternative to any of the foregoing embodiments the at least one of the plurality of fluidly distinct flow channels having the spiral-like configuration has an inlet end arranged at the upstream end of the coalescing insert and an outlet end arranged at the downstream end of the coalescing insert. A twist angle formed between the inlet end and the outlet end is greater than 90 degrees.

In addition to one or more of the features described above, or as an alternative to any of the foregoing embodiments the at least one of the plurality of fluidly distinct flow channels having the spiral-like configuration has an inlet end arranged at the upstream end of the coalescing insert and an outlet end arranged at the downstream end of the coalescing insert. A twist angle formed between the inlet end and the outlet end is equal to or greater than 180 degrees.

In addition to one or more of the features described above, or as an alternative to any of the foregoing embodiments a direction of twist of the spiral-like configuration about the centerline and a direction of a spin of the flow of medium provided to the water separator are the same.

In addition to one or more of the features described above, or as an alternative to any of the foregoing embodiments a direction of twist of the spiral-like configuration about the centerline and a direction of a spin of the flow of medium provided to the water separator are different.

In addition to one or more of the features described above, or as an alternative to any of the foregoing embodiments the plurality of fluidly distinct flow channels have a polygonal shaped cross-section.

In addition to one or more of the features described above, or as an alternative to any of the foregoing embodiments the plurality of fluidly distinct flow channels have a hexagonal shaped cross-section.

In addition to one or more of the features described above, or as an alternative to any of the foregoing embodiments the plurality of fluidly distinct flow channels have a diamond shaped cross-section.

In addition to one or more of the features described above, or as an alternative to any of the foregoing embodiments a shape of a cross-section of each of the plurality of fluidly distinct flow channels is identical.

In addition to one or more of the features described above, or as an alternative to any of the foregoing embodiments a shape of a cross-section of at least one of the plurality of fluidly distinct flow channels is different than the shape of the cross-section of another of the plurality of fluidly distinct flow channels.

In addition to one or more of the features described above, or as an alternative to any of the foregoing embodiments an interior surface of a region of at least one of the plurality of fluidly distinct flow channels is textured.

In addition to one or more of the features described above, or as an alternative to any of the foregoing embodiments a surface area at the region is increased relative to the surface area at another region of the at least one of the plurality of fluidly distinct flow channels that is not textured.

In addition to one or more of the features described above, or as an alternative to any of the foregoing embodiments the coalescing insert is integrally formed with the coalescing channel.

In addition to one or more of the features described above, or as an alternative to any of the foregoing embodiments the coalescing insert is removably mounted within the coalescing channel.

In addition to one or more of the features described above, or as an alternative to any of the foregoing embodiments an inlet duct is fluidly connected to the plurality of fluidly distinct flow channels of the coalescing insert. The inlet duct is arranged downstream from the coalescing insert relative to the flow of medium.

In addition to one or more of the features described above, or as an alternative to any of the foregoing embodiments the inlet duct is mechanically coupled to the coalescing channel.

In addition to one or more of the features described above, or as an alternative to any of the foregoing embodiments an inlet of the water separator is fluidly coupled directly to a turbine outlet of an air cycle machine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
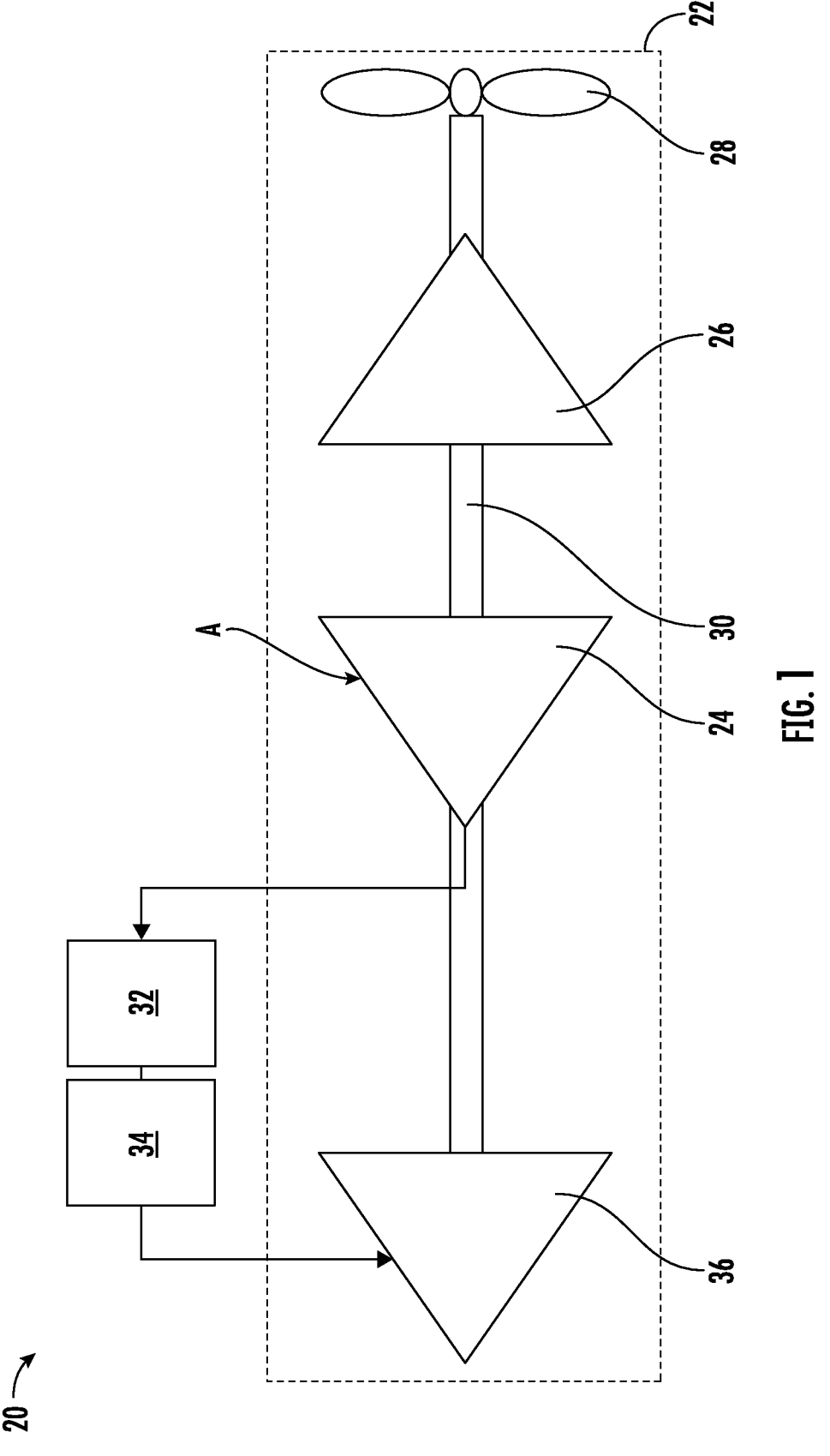
FIG. 1 is a schematic diagram of a portion of an environmental control system according to an embodiment.

With reference now to the FIG. 1, an exemplary portion of an environmental control system 20, such as part of a pack of an environmental control system for example, is illustrated. As shown, the environmental control system (ECS) 20 includes an air cycle machine 22 having a turbine 24, and in some embodiments includes one or more other components, such as a compressor 26 and a fan 28 operably coupled to the turbine 24 by a rotatable shaft 30 for example. In the illustrated, non-limiting embodiment, a water separator 32 and a water collector 34 arranged in series are located downstream from, and in some embodiments directly downstream from the outlet of the turbine 24. The water separator 32 and the water collector 34 in combination may also be referred to herein as a water extractor. It should be understood that embodiments where the water separator 32 and water collector 34 in combination are arranged downstream from any suitable component of the ECS 20 are also contemplated herein. In an embodiment, the water separator 32 is positioned within the ECS 20 to receive a flow of medium, such as a fluid or air A for example, that is cool and has condensed water vapor entrained or suspended therein resulting in a fog-like consistency.

In the illustrated, non-limiting embodiment, the cool, dry medium output from the water collector 34 is provided to a second turbine 36. Although the second turbine 36 is illustrated as being arranged directly downstream from the water collector 34, it should be appreciated that in other embodiments, one or more additional components may be arranged between the outlet of the water collector 34 and the second turbine 36. Further, although the turbine 36 is illustrated as being part of the air cycle machine 22, embodiments where the turbine 36 is separate from the air cycle machine 22 are also within the scope of the disclosure.

Figure 2:
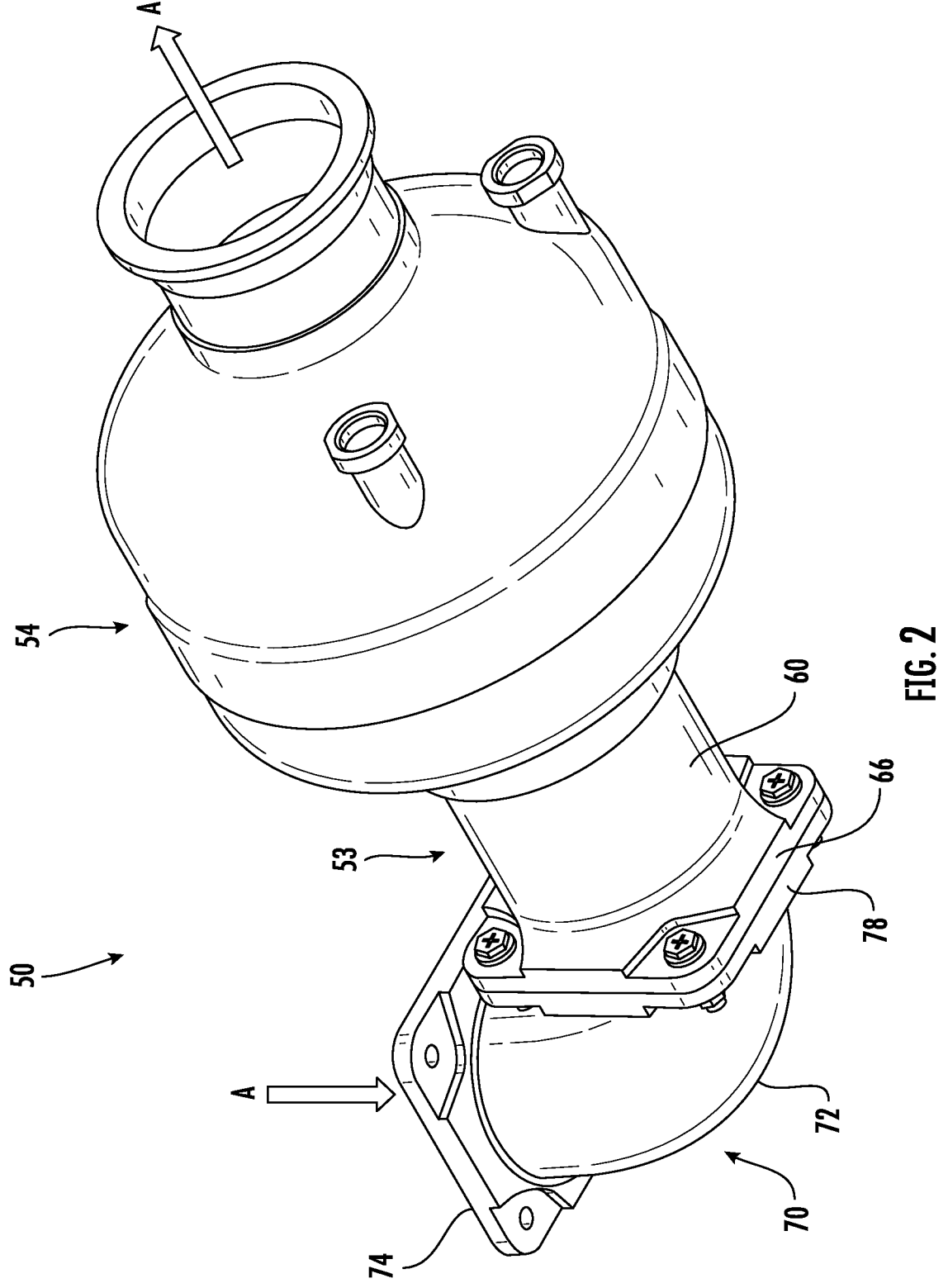
FIG. 2 is a perspective view of a water extractor according to an embodiment.
Figure 3:
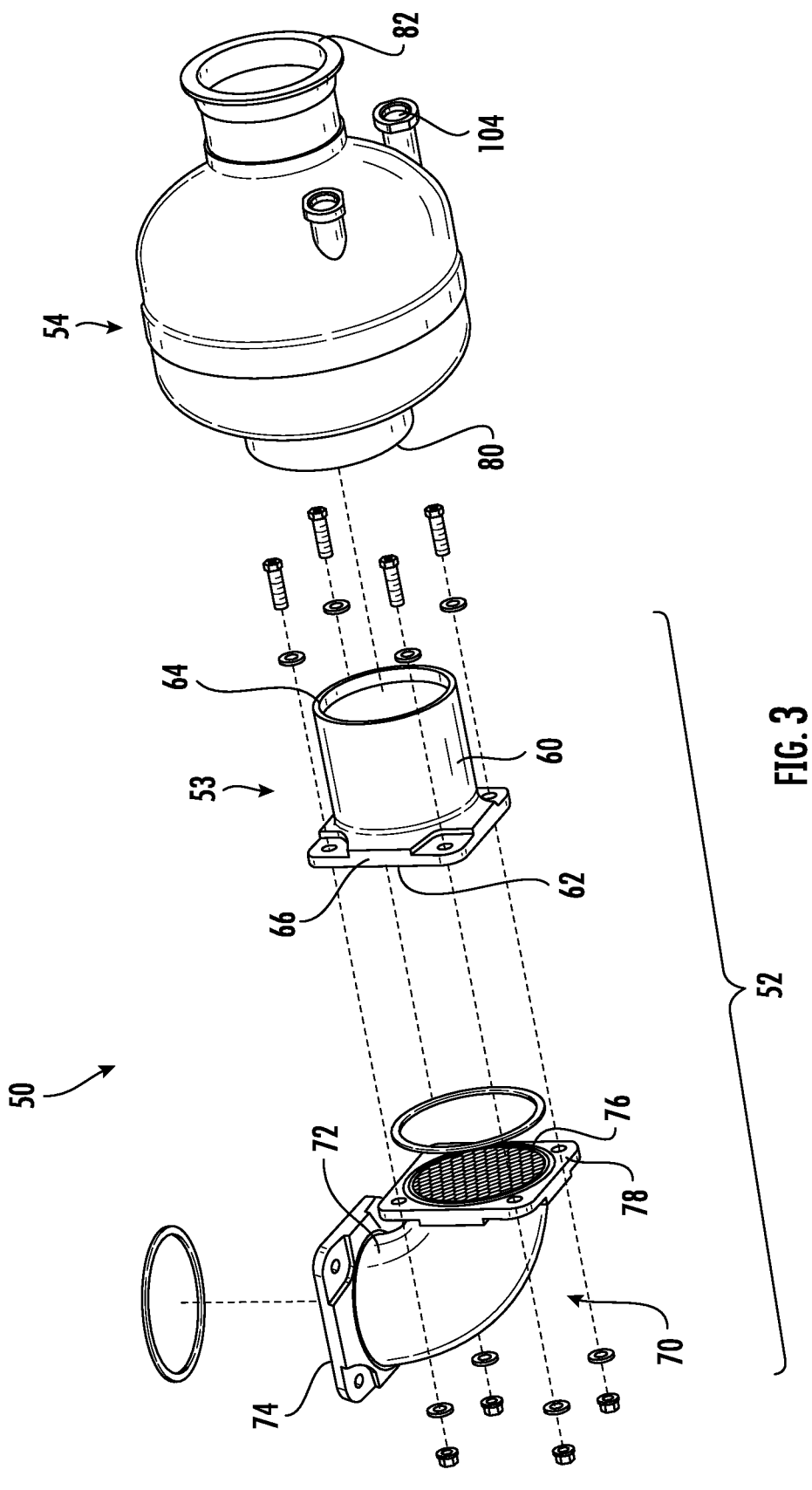
FIG. 3 is an exploded view of the water extractor of FIG. 2 according to an embodiment.
Figure 4:
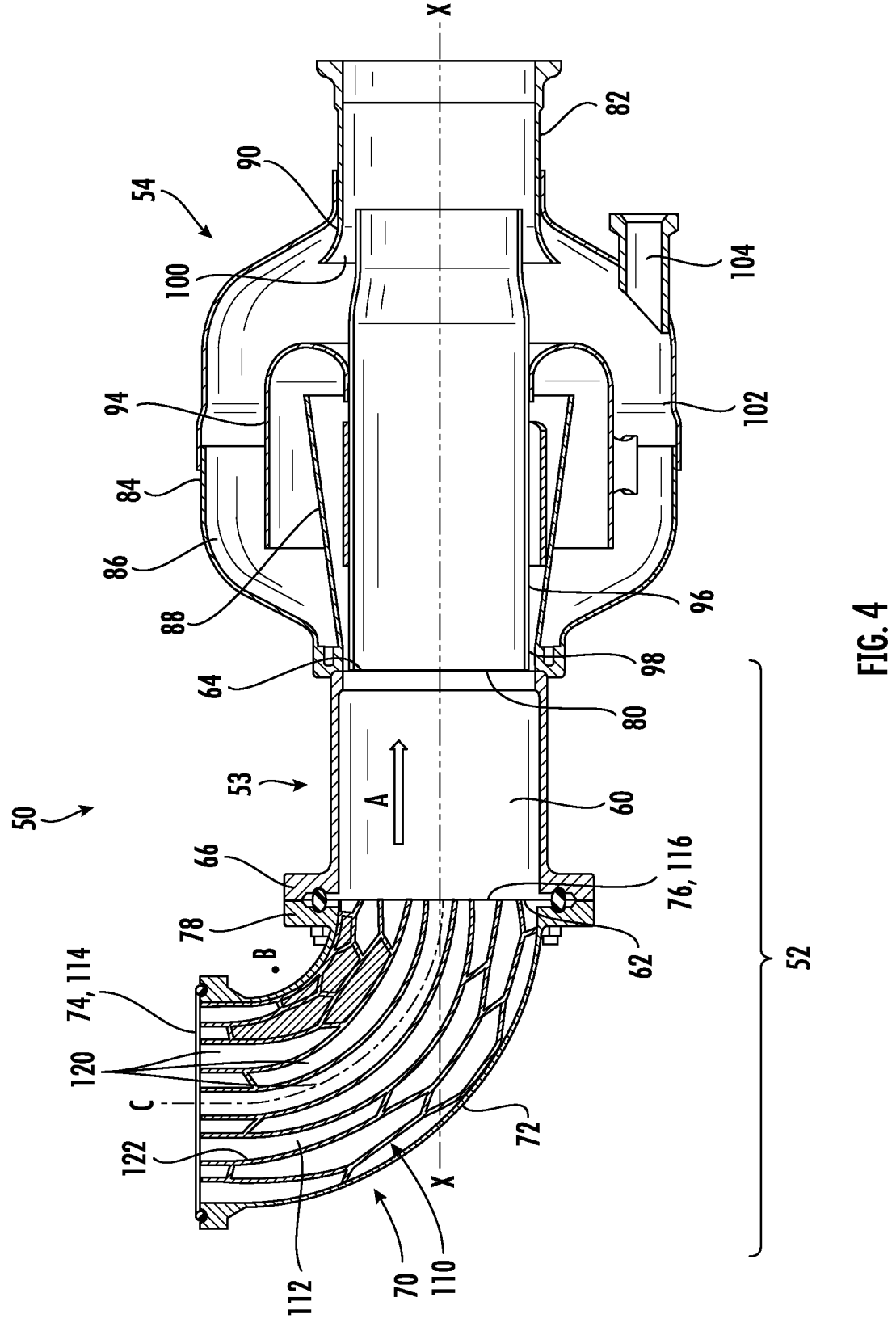
FIG. 4 is a cross-sectional view of the water extractor of FIG. 2 according to an embodiment.

With reference now to FIGS. 2-4, an example of a water extractor 50 suitable for use in an ECS 20 is illustrated. As shown, the water extractor 50 includes a water separator 52, similar to water separator 32, mechanically and fluidly coupled to a water extractor 54, similar to water collector 34. In an embodiment, the water separator 52 and the water extractor 54 are integrally formed, such a via an additive manufacturing process for example. However, in other embodiments, the water separator 52 may be a separate component connected to the water extractor 54 in any suitable manner.

As shown, the water separator 52 includes an inlet duct 53 having a housing or body 60 having a first, upstream end 62 and a second, downstream end 64 relative to a flow of medium A that define a longitudinal axis X of the body 60. In the illustrated, non-limiting embodiment, the body 60 of the inlet duct 53 is generally cylindrical in shape and has a substantially uniform or constant inner diameter. However, it should be appreciated that embodiments where the body 60 has another shape, such as a tapered or conical shape for example, are also contemplated herein. In an embodiment, the body 60 has a substantially linear configuration such that the upstream end 62 and the downstream end 64 are substantially axially aligned and such that the flow path defined between the upstream end 62 and the downstream end 64 extends parallel to the longitudinal axis X.

The downstream end 64 of the body 60 is open and may be directly or indirectly fluidly connected to the water extractor 54. The water extractor 54 may be located coaxially with the longitudinal axis X. In the illustrated, non-limiting embodiment, the downstream end 64 of the body 60 of the inlet duct 53 is fluidly, and in some embodiments mechanically, connected to an upstream end of the water extractor 54. However, in other embodiment, a portion of the water extractor 54, such as an outer housing thereof for example, may be configured to axially overlap the downstream end 64 of the inlet duct 53. In such embodiments, the exterior surface of the body 60 at the downstream end 64 may form a sidewall of the water extractor 54. It should be appreciated that the configuration of the inlet duct 53 illustrated and described herein is intended as an example only and that an inlet duct 53 having another suitable configuration is also within the scope of the disclosure.

With continued reference to FIGS. 2-4, the water separator 52 may additionally, or alternatively, include a coalescing channel 70. As shown, the coalescing channel 70 includes a housing or body 72 having a first, upstream end 74 and a second, downstream end 76 relative to the flow of medium A. In embodiments where the water separator 52 includes both the coalescing channel 70 and the inlet duct 53, the coalescing channel 70 is fluidly coupled to and arranged upstream from the inlet duct 53 relative to a flow of medium A. For example, the downstream end of the coalescing channel 70 may be fluidly connected to the upstream end 62 of the body 60 of the inlet duct 53 as shown. In some embodiments, the coalescing channel 70 is also mechanically coupled to the inlet duct 53 as well. For example, the inlet duct 53 may have a first flange 66 located at the upstream end 62 thereof and the coalescing channel 70 may have a complementary second flange 78 arranged at the downstream end 76 thereof. The two flanges 66, 78 may be affixed to one another via one or more fasteners, or using any other suitable connection mechanism. However, in other embodiments, the coalescing channel 70 and the inlet duct 53 may be integrally formed, such as via additive manufacturing, or may be permanently connected, such as via welding for example.

In the illustrated, non-limiting embodiment, the housing 72 of the coalescing channel 70 is generally cylindrical in shape and has a substantially uniform or constant inner diameter. However, it should be appreciated that embodiments where the housing 72 has another shape, are also contemplated herein. In the illustrated, non-limiting embodiment, the coalescing channel 70 has a bent or curved housing 72. As shown, the upstream end 74 of the housing 72 may be oriented generally perpendicularly to the downstream end 76 thereof. However, embodiments where the body 72 of the coalescing channel 70 is formed having another angle, such as an angle greater than 90 degrees or an angle less than 90 degrees are also contemplated herein.

The water extractor 54 includes an inlet portion 80 and an outlet portion 82. To decelerate the flow of moisture-laden medium A, an annular diffuser 84 concentrically surrounds and is attached to the inlet and outlet portions 80, 82. An exterior of the diffuser 84 may be constructed as a single component, or alternatively, may be defined by a plurality of segments for ease of assembly. An outer section of the diffuser 84 may define a settling chamber 86 in which the moisture within the decelerated flow of medium A falls naturally therefrom. A wall 88 extending from the inlet portion 80 of the water extractor 54 may continuously diverge in the direction of the flow of medium A. Similarly, a wall 90 may extend from the outlet portion 82 having a flared end that is oriented against the direction of airflow.

A guide 94 may be positioned within the gap between the walls 88, 90 and may be attached to an inner surface of the diffuser 84, such as by one or more webs for example. The guide 94 defines a labyrinthine flow path causing a significant airstream deceleration within relatively short axial and radial dimensions while minimizing pressure losses as the air flows into the main body of the diffuser 84.

A guide duct 96 is attached to the guide 94 and extends generally from the inlet portion 80 to the outlet portion 82. The upstream end of the guide duct 96 defines a narrow scupper 98 within the inlet portion 80. The guide duct 96 also extends downstream from the guide 94 to define an ejector 100 between the outlet wall 90 and the exterior of the guide duct 96. A portion of the guide duct 96 may be tapered inwardly in a downstream direction to accelerate the medium A through the ejector 100. A water reservoir 102 and drain 104 are provided at the bottom of the diffuser 84. The placement of the drain depends generally on the angular orientation of the reservoir to allow for gravitational drainage. It should be appreciated that the configuration of the water extractor 54 illustrated and described herein is intended as an example only and that a water extractor having another suitable configuration is also within the scope of the disclosure.

A coalescing insert 110 may be formed or positionable within a portion of the water extractor 50, such as within the water separator 52. In the illustrated, non-limiting embodiment, the coalescing insert 110 is positionable within the interior of the coalescing channel 70 and may extend the entire length or only a portion of the length defined between the upstream end 74 and the downstream end 76 thereof. The coalescing insert 110 may be permanently or removably mountable within the interior of the coalescing channel 70. Alternatively, the coalescing insert 110 may be integrally formed with the coalescing channel 70, such as via an additive manufacturing process for example.

In the illustrated, non-limiting embodiment, the body 112 of the coalescing insert 110 has a generally circular cross-section. The size and shape defined by the outer diameter of the cross-section may be substantially constant over the length of coalescing insert 110. However, it should be understood that the shape of the cross-section of the coalescing insert 110 should be complementary, and in some embodiments substantially identical, to the shape of the cross-section of the interior of the coalescing channel 70. For example, the outer diameter of the first upstream end 114 of the coalescing insert 110 may substantially equal to the inner diameter of the coalescing channel 70. Accordingly, when the coalescing insert 110 is arranged at an interior of the coalescing channel 70, a minimal amount of the medium A, and in some embodiments, none of the medium A, is configured to flow between the exterior surface of the coalescing insert 110 and an interior surface of the coalescing channel 70.

Figure 5:
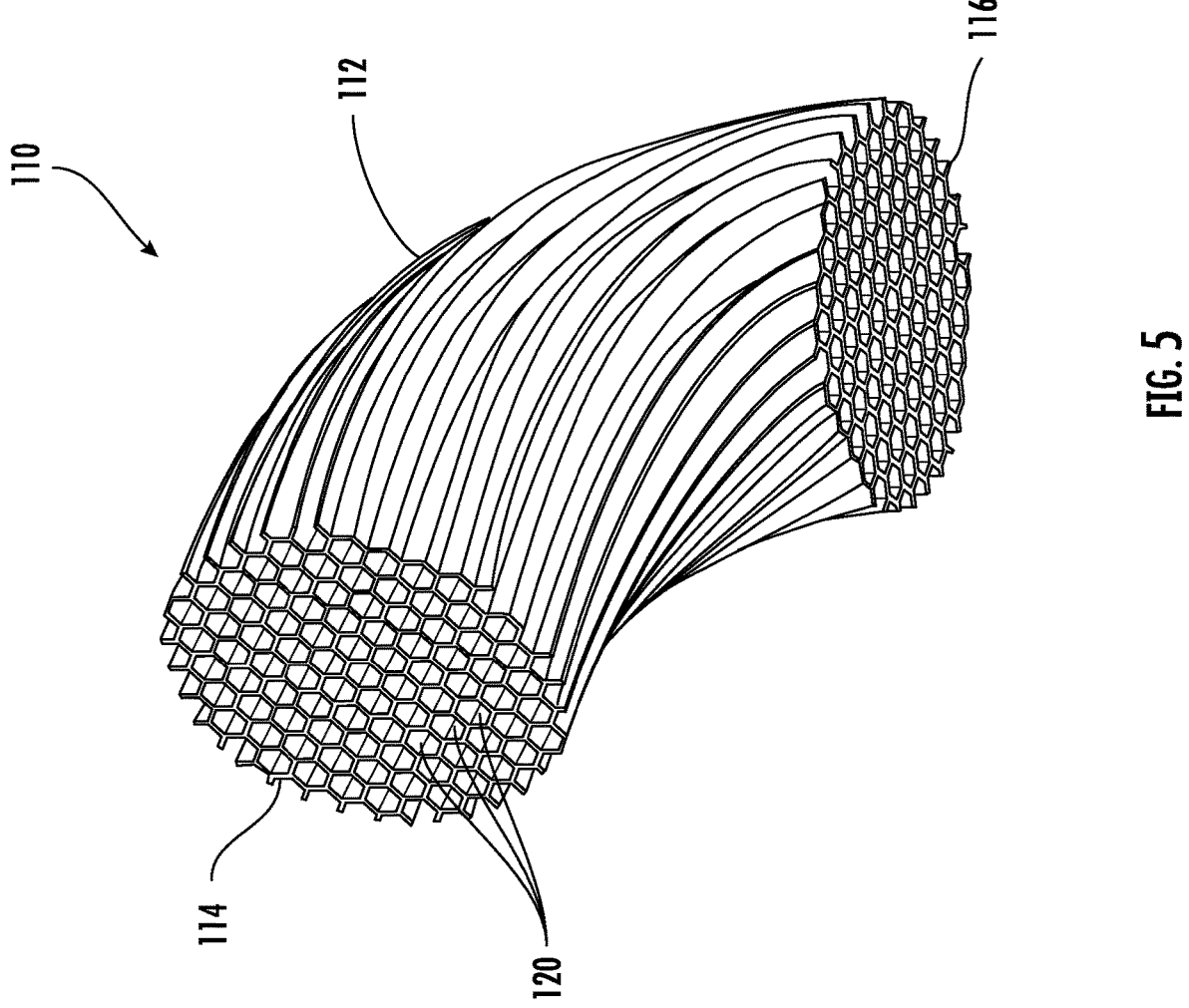
FIG. 5 is a perspective view of a coalescing insert associated with a water separator according to an embodiment.
Figures 6A, 6B:
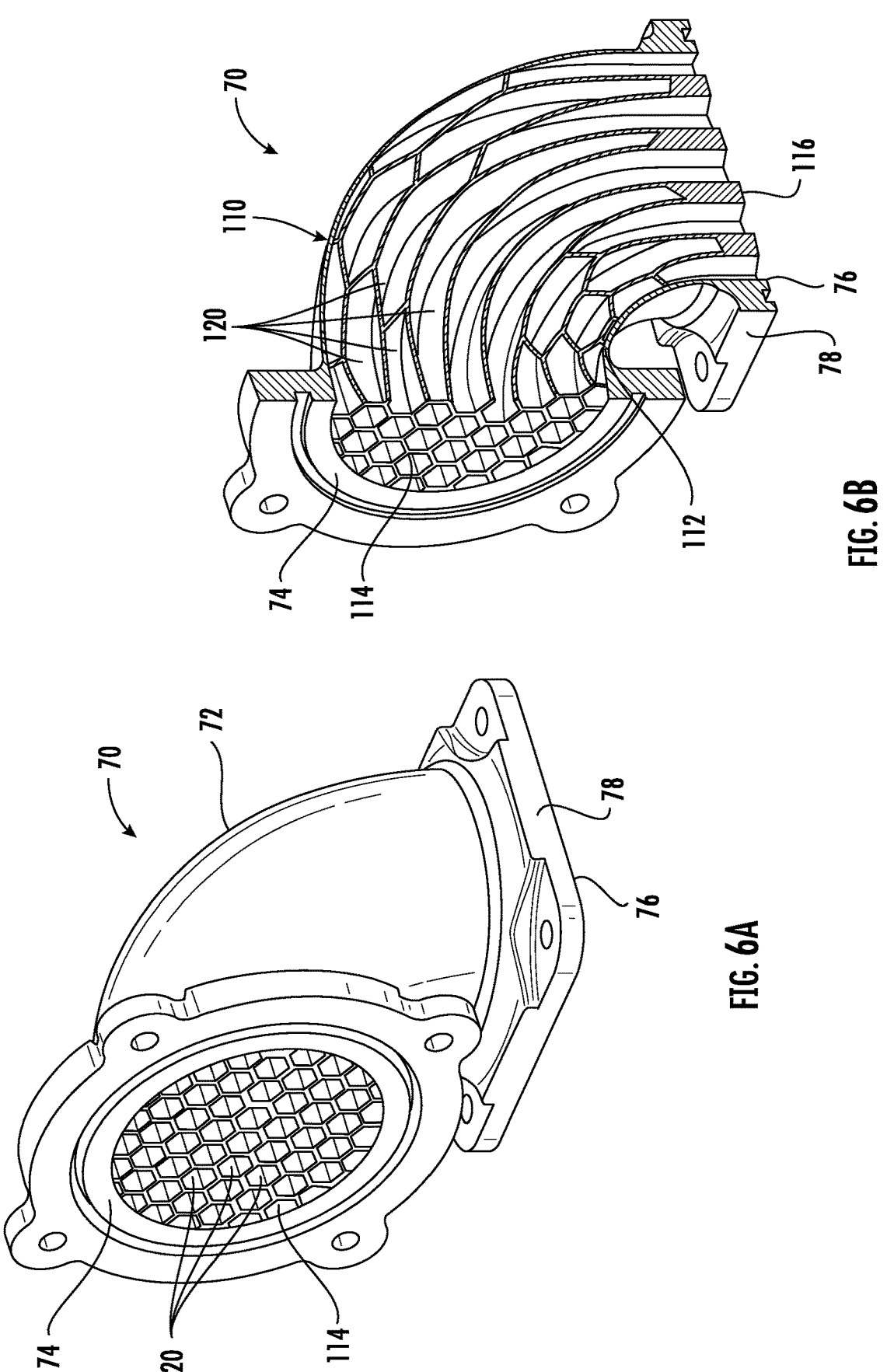
FIG. 6A is a perspective view of a coalescing channel of a water separator including a coalescing insert according to an embodiment.
FIG. 6B is a cross-sectional view of the coalescing channel of FIG. 6A according to an embodiment.

With continued reference to FIG. 4 and further reference to FIGS. 5-6B, in an embodiment, the coalescing insert 110 includes a plurality of fluidly distinct flow channels 120 extending between the first upstream end 114 of the coalescing insert 110 and a second, downstream end 116 of the coalescing insert 110. In an embodiment, the length of each of the plurality of flow channels 120 is substantially uniform. For example, a first end of each flow channel 120 may be arranged within the plane of the upstream end 114 and a second, opposite end of each flow channel 120 may be arranged within a plane of the downstream end 116. The plurality of flow channels 120 may be any suitable shape and are configured to minimize the pressure drop of the flow of medium A as it passes therethrough, increase the efficiency of the flow of medium A, or some combination thereof. In some embodiments, the flow channels 120 may have a generally rounded contour defining a circular cross-sectional configuration for example. In such embodiments, a gap may be defined between adjacent flow channels 120.

In other embodiments, as shown in FIGS. 5-6B, the flow channels 120 may be formed having a generally polygonal shaped cross-sectional. In the illustrated, non-limiting embodiment, the plurality of flow channels 120 are formed with a generally hexagonal shaped cross-section. In other embodiments, the plurality of flow channels 120 may be formed with a generally rhomboid or diamond shaped cross-section. Through the use of one or more polygonal shapes, such as a hexagonal shaped cross-section for example, adjacent flow channels 120 may efficiently share walls while also providing a minimal obstruction to the flow of medium A through the coalescing insert 110. Further, by using a polygonal shaped flow channels 120 having corners, the corners may provide pockets within which coalesced water can accumulate to form rivulets as the medium A flows through a flow channel 120. However, it should be understood that a flow channel 120 having any shape is within the scope of the disclosure. Although each of the flow channels 120 is illustrated as being substantially identical to one another, for example generally uniform in size and/or shape, in other embodiments, the size and/or shape of at least a portion of one or more of the flow channels 120 may vary from a corresponding portion of another of the flow channels 120.

Further, the size and/or shape of each flow channel 120 may be generally constant over the length of the coalescing insert 110 as shown, or alternatively, may vary between the first upstream end 114 and the second downstream end 116 of the coalescing insert 110. For example, one or more of the flow channels 120 may increase or decrease in size over the length of the coalescing insert 110. In embodiments where at least one of the size and shape of a flow channel 120 varies between the upstream end 114 and the downstream end 116 of the coalescing insert 110, it should be understood that the variation between adjacent flow channels 120 may be the same or may be different. In such embodiments, any gap defined between adjacent flow channels 120 within the coalescing insert 110 may also vary.

The interior surface 122 of one or more of the flow channels 120 may be substantially smooth. In other embodiments, at least a portion of the interior surface 122 of one or more of the flow channels 120 may be textured or roughened. Inclusion of such texture may increase the overall surface area of the interior surface 122 of the flow channel 120 at that region relative to the surface area at another region that is not textured.

In the illustrated, non-limiting embodiment, each of the flow channels 120 is curved about a bend axis B (see FIG. 4) to form a non-linear or curved shape complementary to the coalescing channel 70. The bend axis B may be oriented substantially perpendicular to the longitudinal axis X of the water extractor 50. Further, the bend axis B may be arranged at a center of the coalescing insert 110 such that a distance from the bend axis to the upstream end 114 of the coalescing insert 110 is equal to a distance from the bend axis B to the downstream end 116 of the coalescing insert 110. However, embodiments where the distance between the upstream end 114 of the coalescing insert 110 and the bend axis B is greater than the distance between the bend axis B and the downstream end 116 of the coalescing insert 110 and embodiments where the distance between the upstream end 114 of the coalescing insert 110 and the bend axis B is greater than the distance between the bend axis B and the downstream end 116 of the coalescing insert 110 are also within the scope of the disclosure.

The coalescing channel 70 may have a centerline C extending along a flow path of the medium A therethrough, and in some embodiments, one or more of the flow channels 120 are oriented such that the flow channel 120 extends generally parallel to this centerline C. In such embodiments, an inlet end, and an outlet end of a respective flow channel 120 oriented parallel to the centerline C are axially aligned. In other embodiments, a swirl may be imparted to the medium A within one or more of the flow channels 120 of the coalescing insert 110. In an embodiment, as shown in FIGS. 5-6B, at least one of the flow channels 120 is configured to wrap about the centerline of the coalescing insert 110 in a helical or spiral-like configuration. In such embodiments, the flow of medium A within a flow channel 120 is configured to spin or swirl about the centerline of the coalescing insert 110. For example, the plurality of flow channels 120 may twist approximately 90 degrees between the upstream end 114 and the downstream end 116 of the coalescing insert 110. However, embodiments where the flow channels 120 have a twist angle greater than 90 degrees, such as up to 180 degrees, up to 270 degrees, up to 360 degrees, or more are also contemplated herein. Further, embodiments where the twist angle is greater than 0 and less than 90 degrees are also within the scope of the disclosure.

The direction of the twist or spiral of the at least one flow channel 120 may be the same as the spin acting on the medium A output from the turbine 24, or alternatively, may be in opposite the direction of the spin acting on the medium output from the turbine 24. In embodiments where a plurality of the flow channels 120 have a spiral-like configuration, it should be appreciated that the circumferential distance of the spiral about the central axis X applied to flow channels 120 may vary, such as based on the position of the flow channel 120 relative to the insert (such as close to the center vs. the outer periphery).

In operation, as the flow of medium A output from a component, such as the turbine outlet of turbine 24 for example, passes through the plurality of flow channels 120 of the coalescing insert 110 in parallel, moisture within the flow of medium A will coalesce in the form of droplets on the interior surface 122 of the flow channels 120, such as within any corners of the flow channels 120. As a result, a flow of drier medium A will be arranged at the center of each flow channel 120. During this coalescing, the flow of medium A will cause these droplets formed on the interior surface 122 of the flow channels 120 to move through the flow channels 120, through the inlet duct 53 when included, and into the water extractor 54 positioned directly downstream from the water separator 52. The water extractor 54 may further separate a flow of medium having water entrained therein from a central drier flow of medium as is known in the art.

A water separator 52 including a coalescing insert 110 arranged within a coalescing channel 70 as illustrated and described herein facilitates, and in some embodiments maximizes, the separation of water from a flow of medium A, such as an airflow for example, within a small sizing envelope. As a result, the need for swirl vanes and/or a center body to impart a rotation to the flow of medium A as known in the art is eliminated. Additionally, the overall packaging of a pack of the ECS 20 may be reduced, and the pressure drop of the medium within the water separator may be minimized. The water separator 52 may be particularly useful for removing water from a flow of medium A when the water is in the form or a mist or fog, such as may be received from an outlet of a turbine. Further, by using the water separator 52 in an ECS pack 20 having two turbines 24, 36 arranged in series relative to the flow of medium A, the first turbine 24 may be configured to maintain the temperature of the medium A above freezing, whereas the second turbine 36 may be configured to achieve a necessary pressure and/or temperature of the medium to be provided to a load.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water separator for use in an environmental control system of an aircraft comprising:
   a coalescing channel having a curved housing, said coalescing channel having a hollow interior; and
   a coalescing insert arranged within the hollow interior of the coalescing channel, the coalescing insert having an upstream end, a downstream end, and plurality of fluidly distinct flow channels extending between the upstream end and the downstream end such that the plurality of fluidly distinct flow channels receive a flow of medium in parallel;

wherein the coalescing insert has a centerline and at least one of the plurality of fluidly distinct flow channels has a spiral-like configuration about the centerline.

2. The water separator of claim 1, wherein the coalescing channel has an upstream end and a downstream end, the upstream end being oriented perpendicularly to the downstream end.

3. The water separator of claim 1, wherein the at least one of the plurality of fluidly distinct flow channels having the spiral-like configuration has an inlet end arranged at the upstream end of the coalescing insert and an outlet end arranged at the downstream end of the coalescing insert, and a twist angle formed between the inlet end and the outlet end is 90 degrees.

4. The water separator of claim 1, wherein the at least one of the plurality of fluidly distinct flow channels having the spiral-like configuration has an inlet end arranged at the upstream end of the coalescing insert and an outlet end arranged at the downstream end of the coalescing insert, and a twist angle formed between the inlet end and the outlet end is greater than 90 degrees.

5. The water separator of claim 1, wherein the at least one of the plurality of fluidly distinct flow channels having the spiral-like configuration has an inlet end arranged at the upstream end of the coalescing insert and an outlet end arranged at the downstream end of the coalescing insert, and a twist angle formed between the inlet end and the outlet end is equal to or greater than 180 degrees.

6. The water separator of claim 1, wherein a direction of twist of the spiral-like configuration about the centerline and a direction of a spin of the flow of medium provided to the water separator is the same.

7. The water separator of claim 1, wherein a direction of twist of the spiral-like configuration about the centerline and a direction of a spin of the flow of medium provided to the water separator is the different.

8. The water separator of claim 1, wherein the plurality of fluidly distinct flow channels have a polygonal shaped cross-section.

9. The water separator of claim 8, wherein the plurality of fluidly distinct flow channels have a hexagonal shaped cross-section.

10. The water separator of claim 8, wherein the plurality of fluidly distinct flow channels have a diamond shaped cross-section.

11. The water separator of claim 1, wherein a shape of a cross-section of each of the plurality of fluidly distinct flow channels is identical.

12. The water separator of claim 1, wherein a shape of a cross-section of at least one of the plurality of fluidly distinct flow channels is different than the shape of the cross-section of another of the plurality of fluidly distinct flow channels.

13. The water separator of claim 1, wherein an interior surface of a region of at least one of the plurality of fluidly distinct flow channels is textured.

14. The water separator of claim 13, wherein a surface area at the region is increased relative to the surface area at another region of the at least one of the plurality of fluidly distinct flow channels that is not textured.

15. The water separator of claim 1, wherein the coalescing insert is integrally formed with the coalescing channel.

16. The water separator of claim 1, wherein the coalescing insert is removably mounted within the coalescing channel.

17. The water separator of claim 1, further comprising an inlet duct fluidly connected to the plurality of fluidly distinct flow channels of the coalescing insert, the inlet duct being arranged downstream from the coalescing insert relative to the flow of medium.

18. The water separator of claim 17, wherein the inlet duct is mechanically coupled to the coalescing channel.

19. The water separator of claim 1, wherein an inlet of the water separator is fluidly coupled directly to a turbine outlet of an air cycle machine.

20. A water separator for use in an environmental control system of an aircraft comprising:

a coalescing channel having a curved housing, said coalescing channel having a hollow interior; and a coalescing insert removably mounted within the hollow interior of the coalescing channel, the coalescing insert having an upstream end, a downstream end, and plurality of fluidly distinct flow channels extending between the upstream end and the downstream end such that the plurality of fluidly distinct flow channels receive a flow of medium in parallel.

21. A water separator for use in an environmental control system of an aircraft comprising:

a coalescing channel having a curved housing, said coalescing channel having a hollow interior; and a coalescing insert arranged within the hollow interior of the coalescing channel, the coalescing insert having an upstream end, a downstream end, and plurality of fluidly distinct flow channels extending between the upstream end and the downstream end such that the plurality of fluidly distinct flow channels receive a flow of medium in parallel;

wherein an interior surface of a region of at least one of the plurality of fluidly distinct flow channels is textured and a surface area at the region is increased relative to the surface area at another region of the at least one of the plurality of fluidly distinct flow channels that is not textured.

\* \* \* \* \*